| United States Patent [19] | [11] Patent Number: 4,940,561 |
| Fritz | [45] Date of Patent: Jul. 10, 1990 |

[54] METHOD FOR FORMING A POLYMERIC MOLD

[76] Inventor: Kenneth E. Fritz, 1324 Hybla Rd., Richmond, Va. 23236

[21] Appl. No.: 306,107

[22] Filed: Feb. 6, 1989

[51] Int. Cl.⁵ .............................................. B29C 41/08
[52] U.S. Cl. ................................... 264/225; 264/309; 249/135
[58] Field of Search ............... 264/219, 225, 226, 227, 264/309; 524/437; 249/135

[56] References Cited

U.S. PATENT DOCUMENTS 4,073,049 2/1978 Lint ...................................... 264/219
4,366,202 12/1982 Borovsky ............................. 264/221
4,740,343 4/1988 Gaku ................................... 264/219

Primary Examiner—Jay H. Woo
Assistant Examiner—Jeremiah F. Durkin, II
Attorney, Agent, or Firm—I. Michael Bak-Boychuk

[57] ABSTRACT

A method of forming a coating useful for forming casting molds including agitating a quantity of polyester resin and admixing into the resin a quantity of aluminum powder, storing the mixture for 12 to 24 hours, introducing a catalyst into the mixture and spraying the mixture onto an object defining a mold cavity of a casting mold. The atomized aluminum powder should have a weight ratio of 10 to 50 percent of the resin and should have a ration of 4 times 200 mesh/ 1 times 400 mesh+2 times 200 mesh/1 times 400 mesh.

2 Claims, 1 Drawing Sheet

METHOD FOR FORMING A POLYMERIC MOLD

BACKGROUND OF THE INVENTION

1. Field of the Invention

The present invention relates to polymeric casting mold structures, and more particularly to polymer casting molds which include metallic fillers and the method for forming same.

2. Description of the Prior Art

Recent developments in the material sciences has brought forth a variety of materials useful in general application. Amongst those are the materials in the polyester resin group, various polyurethane, vinyl chloride polymers as well as the various phenol formaldehyde resins and epoxy resins. The resins, in particular, are well suited for low cost fabrication, resulting in useful articles which are inert, of substantial strength and hardness, and well suited for machining and mechanical finishing. This material stability, its inert response to chemicals of general exposure, and its tolerance to heat and structural load have led to a wide acceptance of these resins in household use. In consequence many of the bath fixtures of a typical household are now of one of the various polymers which, because of their fabrication convenience, have led to a virtual explosion in the variety of shapes, functions and competing sources that are obtained.

One group of bath fixtures is the cultured marble group comprising articles like sink tops, bath tubs and the like. Typically, articles of this kind are formed by casting with their surface finish directly determined by the surface qualities of the casting mold. Since the same conveniences in casting are also useful in the production of the mold, the mold itself is often made from the same or similar material. This material similarity between the casting mold and the article cast therein and the exothermic reaction often associated with the casting often significantly limit the mold life. Moreover, close control over the mold release coatings and the surface finish of the mold are inherent to such material similarity.

Thus, inexpensive techniques for modifying the material properties of the mold surface are extensively sought and it is one such technique that is disclosed herein.

SUMMARY OF THE INVENTION

Accordingly, it is the general purpose and object of the present invention to provide a material compound useful in the making of casting molds.

Other objects of the invention are to provide a polymeric material compound in which a powdered and atomized metallic filler is distributed.

Yet further objects of the invention are to provide a casting mold material compound high in thermal conductivity, in its surface hardness and well adapted for rugged use.

Briefly, these and other objects are accomplished within the present invention by admixing into unsaturated polyester base resin atomized aluminum powder comprising a mixture of 200 mesh (coarse) and 400 mesh (fine) in substantially the following ratio:

$$\frac{2 \text{ coarse}}{1 \text{ fine}} + \frac{4 \text{ coarse}}{1 \text{ fine}}$$

Preferably, this admixture of metallic powder is at 10% to 50%, by weight, of the unsaturated polyester resin and thus acts as a filler. For the purpose of spray deposition on the surface of a forming buck, flow control agents and levelers like those sold under the product designation BYKW940, by BYK-Chemie-USA, Wallingford, Conn., may be mixed into the polyester base resin at 1 to 1½% by weight along with air release additives such as those sold under the product number A501 by BYK-Chemie-USA, Wallingford, Conn., or their equivalents. Flow control and surface finish may be further controlled by adding styrene monomers for controlling the viscosity, in complementary combination with one of a variety of surfactants, exemplified by surfactants in the sodium sulfonate group.

This resulting mixture of the metallic powder filled unsaturated resin (gel coat resin) may then be left to set for twelve to twenty-four hours to allow full wetting of the granular filler. Immediately prior to spraying onto the buck the appropriate catalyst may then be added into the mixture.

In this form mold surface coating is devised which is easily delivered to the surface of the buck by a variety of known airless or pressurized air spraying techniques, deposited to a thickness of 0.015 to 0.060 inches. This coating, unlike the gel coat usually obtained by spraying unsaturated polyester resin alone, obtains the thermal conductivity, the surface hardness and thermal expansion properties which are mainly those of the metallic filler.

Moreover, substantial control over surface finish is obtained by selection of the surfactants and viscosity reducing additives. These then permit a variety of exposures of the particulate filler at the surface. Thus, a variety of complementary surface finishes of the article cast therein may be easily controlled with particular convenience of a pocketed finish duplicating the finish of natural marble.

Of course, once the mold surface coating cures the mold structure may then be reinforced and strengthened for use by various lay-ups of fiber reinforced plies.

As used herein the term "unsaturated polyesters" refers to the low molecular weight products such as those obtained through the reaction of maleic anhydrate with diethylene glycol. Of course products of reaction of other acids (or anhydrates) such as fumaric acid, and glycols, such as propylene glycol, may be reacted in a similar manner and the apparatus and process set out herein is not confined solely to polyester resins.

These resins may be in their unpromoted form, or in the promoted form as obtained by introducing, for example, cobalt soaps (cobalt naphtanate, octoate, or nonate) into the polyester.

When catalyzed and cured resins in these polymer groups are known for their structural aspects. Nonetheless, in their gel coat application checking, cracking and fractures due to uneven distortion are frequent events, particularly in the presence of thermal gradients and stress. It is these problems that are resolved by the admixture set out herein.

Moreover, when used as the surface coat (gel coat) of a casting mold for casting articles formed from similar polymers (e.g. cultured marble) the material similarity provides unwanted surface bonding to the mold. Thus, the admixture of the metallic filler to the surface coating of the mold improves its structural and thermal properties while reducing surface bonding with the article cast.

DESCRIPTION OF THE PREFERRED EXAMPLES

Figure 1:
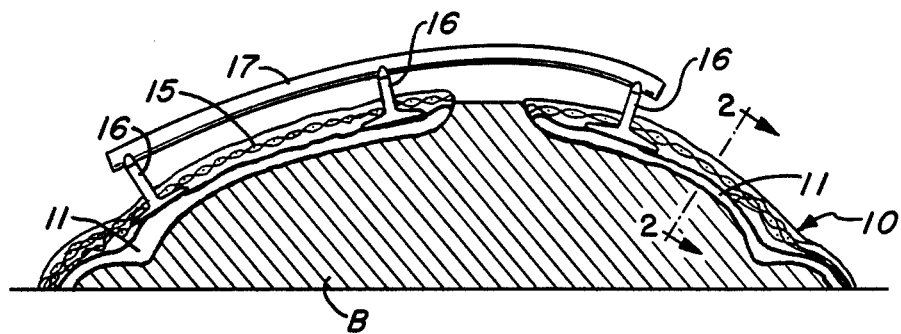
FIG. 1 is a sectional view of a mold lay-up in accordance with the present invention.

As shown in FIGS. 1-4 the inventive casting mold assembly, generally designated by the numeral 10, is formed by first spraying onto the buck B a surface layer 11. This surface layer 11 comprises an admixed (filled) material composition of prepromoted polyester resin, catalyst and metallic, powdered filler in the propositions and ratios described in detail below. Added to this admixture are various flow control additives, viscosity control additives and surfactants, all selected to obtain surface tension and viscosity differentials by which the granular metallic filler is partially exposed at the surface. This "terrazzo" surface finish results in a pocketed surface 111 in the article 110 cast in the mold 10, defined as a plurality of intersecting surface depressions 112 between intersection cusps 113. The narrow section of cusps 113 is particularly suited for eventual wet sanding of the cast article 110, resulting in a surface which closely approximates the surface of finished marble. Thus, the casting mold 10 is particularly suited for forming cultured marble articles and fixtures, like those used in a household bath.

Once the catalysed surface layer 11 sets up and is cured a set of exterior fiber reinforced coverings 15 may be bonded on the exterior thereof into which tooling fixtures or holding posts 16 may be bedded. Of course such posts 16 may then be tied to a carrying cage 17.

As result a casting mold assembly 10 is formed which, when removed from the buck B and inverted, may be used for casting of cultured marble articles 110. The resulting interior surface of surface layer 11 then defines the surface finish of its surface 111.

To effect this surface layer 11 of a surface coating material is applied onto the buck mixed and comprising in accordance with the following examples:

EXAMPLE 1 a sufficient quantity of pre promoted, unsaturated base polyester resin is deposited in an inert container and agitated for even distribution. One example of such resin is the resin sold under the product designation G1325 by H & K Research, Hickory, N.C. Such resins are normally referred to as "gel-coat" resins and may include other polymers as, for example, the polymers of vinyl ester resin. In accordance with sound practice air release additives, such as those sold under the product designation A501 by BYK-Chemie-USA or their equivalents, may be introduced into the resin.

Once agitated a flow control agent such as the agent of the chemical group known as Silanes & Silicones and exemplified by the flow control agent leveler sold under the produce designation BYK-W-940 by BYK-Chemie-USA is introduced into the resin, in a ratio of 1 to 1½% by weight to which a viscosity controlling additive such as any one of the styrene monomers exemplified by the product sold under the product designation 50160 by H&K Research. Preferably this viscosity control agent is added to the resin at a ratio of 1–3%, by weight.

At this point, a mixture of powdered, atomized, aluminum filler comprising the following range of mesh ratios:

$$\frac{2 \times 200 \text{ mesh (coarse)}}{1 \times 400 \text{ mesh (fine)}} \text{ to } \frac{4 \times 200 \text{ mesh (coarse)}}{1 \times 400 \text{ mesh (fine)}}$$

is introduced into the resin to a weight ratio of 10% to 50%. Along with the filler may be added any one of the surfactants from the sodium sulfonate group such as sodium allyl, styrene, or xylene sulfonate the quantity of such surfactants being generally less than 1% of the resin weight.

The resin and the admixed filler, additives and agents are then thoroughly mixed for full wetting and filler dispersal. The mixture is then left to set for a period of 12 to 24 hours in the course of which full filler wetting takes place by the combined actions of the viscosity agents, flow agents and the surfactant. At the end of this period the mixture obtains a creamy state and may then be heated to its best reacting temperature, e.g., 68 to 75 degrees F.

Once raised to this temperature a catalyst such as methyl ethyl ketone peroxide exemplified by the product Superox 702 sold by Reichold Chemical Inc., Jacksonville, Fla., added to the mix in a quantity selected to promote complete curing in ambient conditions. This catalysed mixture is then sprayed onto the exterior of the buck B to a thickness of 0.015 to 0.060 inches, thus forming the surface layer 11 described above.

EXAMPLE 2

Alternatively, unpromoted polyester resin is admixed with one of the various proprietary promoters as, for example, those based on Cobalt soap, in accordance with the mix suggested by the fabricator. Thereafter, the same sequence is effected as that set out in Example 1.

One should note that the quiescent period of the mixture before spraying and the agitation first applied fully disperse the promoter. Thus an even distribution is obtained for the uses set out.

Figure 2:
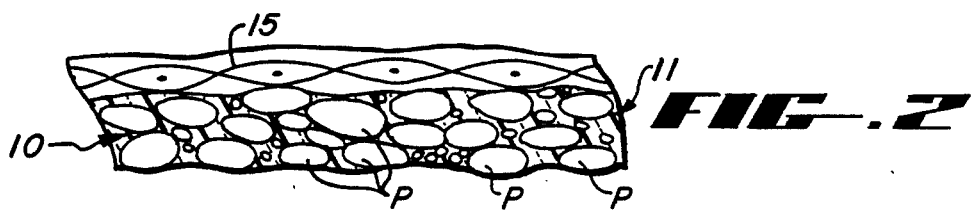
FIG. 2 is an enlarged sectional detail taken along line 2—2 of FIG. 1.
Figure 3:
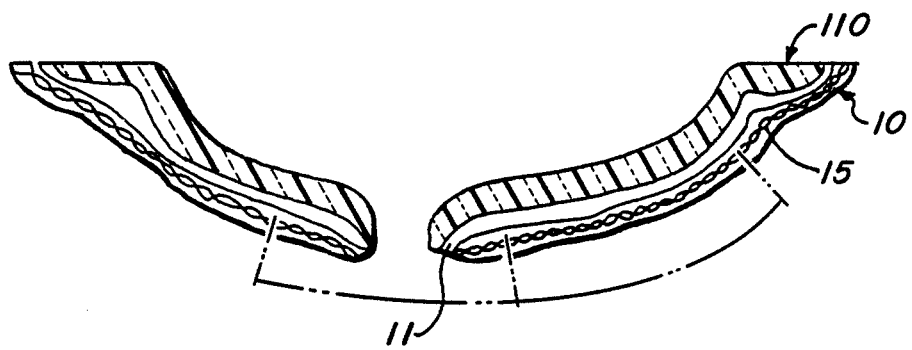
FIG. 3 is a sectional side view of the inventive mold aligned for casting.
Figure 4:
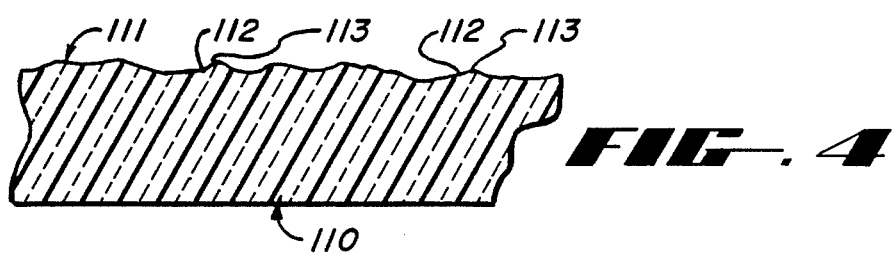
FIG. 4 is a surface detail, in section, of an article cast in the manner shown in FIG. 3.

In each instance the resin serves as the bonding agent for the filler particulate matter. Since a mix of several grades of filler is utilized a large amount of direct surface contact is expected between the filler particles P, as shown in FIG. 2. Thus, in compression, thermal expansion and in hardness the properties of the filler are those dominantly expressed. Only in elastic expansion are there any properties of the resin expressed in any manner.

In this form a casting mold material structure is conveniently devised, both simple in fabrication and in the course of any repair.

Obviously many modifications and changes may be made to the foregoing without departing from the spirit of the invention. It is therefore intended that the scope of the invention be determined solely on the claims appended hereto.

What is claimed is:

1. A method for producing a coating useful in forming casting molds comprising the steps of:
    agitating a quantity of pre-promoted polyester resin in a container;
    admixing into said resin, in the course of said agitation, a quantity of atomized aluminum powder to a weight ratio of 10% to 50% of said resin said atomized aluminum powder admixed in said resin including aluminum powder comprising the ratios of $$\frac{4 \text{ times 200 mesh}}{1 \text{ times 400 mesh}} + \frac{2 \text{ times 200 mesh}}{1 \text{ times 400 mesh}}$$

storing said mixture of said resin and powder for a period of 12 to 24 hours;
introducing a catalyst into said mixture; and
spraying said catalyzed mixture onto an object defining the mold cavity of a casting mold.

2. A method according to claim 1 wherein:
said catalyzed mixture is sprayed onto said object to a thickness of 0.015 to 0.060 inches.

* * * * *